United States Patent
Chandra et al.

(10) Patent No.: US 11,847,036 B2
(45) Date of Patent: *Dec. 19, 2023

(54) FAULT ISOLATION AND RECOVERY OF CPU CORES FOR FAILED SECONDARY ASYMMETRIC MULTIPROCESSING INSTANCE

(71) Applicant: Cisco Technology, Inc., San Jose, CA (US)

(72) Inventors: Amit Chandra, San Jose, CA (US); Nivin Lawrence, Fremont, CA (US); Etienne Martineau, Gatineau (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/067,897

(22) Filed: Dec. 19, 2022

(65) Prior Publication Data

US 2023/0118408 A1    Apr. 20, 2023

Related U.S. Application Data

(63) Continuation of application No. 16/854,302, filed on Apr. 21, 2020, now Pat. No. 11,531,607.

(Continued)

(51) Int. Cl.
| | | |
|---|---|---|
| *G06F 11/22* | (2006.01) | |
| *G06F 9/48* | (2006.01) | |
| *G06F 9/38* | (2018.01) | |
| *G06F 9/4401* | (2018.01) | |
| *G06F 9/30* | (2018.01) | |

(52) U.S. Cl.
CPC ...... *G06F 11/2242* (2013.01); *G06F 9/30101* (2013.01); *G06F 9/3861* (2013.01); *G06F 9/4401* (2013.01); *G06F 9/4812* (2013.01)

(58) Field of Classification Search
CPC .. G06F 11/2242; G06F 9/3861; G06F 9/4401; G06F 9/4812
See application file for complete search history.

(56) References Cited

U.S. PATENT DOCUMENTS

| | | |
|---|---|---|
| 6,199,179 B1 | 3/2001 | Kauffman |
| 10,069,688 B2 | 9/2018 | Atyam |

(Continued)

FOREIGN PATENT DOCUMENTS

| | | | |
|---|---|---|---|
| JP | 2011-107799 A | 6/2011 | |
| WO | 2001/80007 A2 | 10/2001 | |

OTHER PUBLICATIONS

PCT Notification of Transmittal of the International Search Report and the Written Opinion of the International Searching Authority, or the Declaration dated Mar. 26, 2021.

(Continued)

*Primary Examiner* — Zachary K Huson
(74) *Attorney, Agent, or Firm* — Baker Botts L.L.P.

(57) ABSTRACT

According to certain embodiments, a system includes one or more processors and one or more computer-readable non-transitory storage media comprising instructions that, when executed by the one or more processors, cause one or more components to perform operations including executing a software process of a secondary instance, the secondary instance running in parallel with a primary instance and associated with a plurality of cores including a bootstrap core, registering a non-maskable interrupt for the bootstrap core in the secondary instance, determining whether the secondary instance is in a fault state, wherein, if the secondary instance is in the fault state, halting the plurality of cores associated with the secondary instance, without impact to the primary instance, and recovering the bootstrap core by switching a context of the bootstrap core from the secondary (Continued)

instance to the primary instance via the non-maskable interrupt.

20 Claims, 5 Drawing Sheets

Related U.S. Application Data

(60) Provisional application No. 62/946,289, filed on Dec. 10, 2019.

(56) References Cited

U.S. PATENT DOCUMENTS

| 10,528,351 | B2 | | 1/2020 | Lewis | |
|---|---|---|---|---|---|
| 11,531,607 | B2 | * | 12/2022 | Chandra | ............... G06F 9/3861 |
| 2015/0143082 | A1 | | 5/2015 | Smith | |
| 2016/0041850 | A1 | | 2/2016 | Akira | |
| 2016/0077884 | A1 | | 3/2016 | Hunter | |
| 2016/0112346 | A1 | | 4/2016 | Nahrgang | |
| 2019/0278677 | A1 | | 9/2019 | Terechko | |
| 2021/0034447 | A1 | | 2/2021 | Horvath | |

OTHER PUBLICATIONS

Zellweger, et al., "Decoupling Cores, Kernels and Operating Systems," Systems Group, Department of Computer Science, ETH Zurich, USENIX Association, 11th USENIX Symposium on Operating Systems Design and Implementation (OSDI'14) (pp. 17-31) Oct. 6, 2014.

* cited by examiner

FAULT ISOLATION AND RECOVERY OF CPU CORES FOR FAILED SECONDARY ASYMMETRIC MULTIPROCESSING INSTANCE

PRIORITY

This nonprovisional application is a continuation under 35 U.S.C. § 120 of U.S. patent application Ser. No. 16/854,302 filed on Apr. 21, 2020 and entitled "Fault Isolation and Recovery of CPU Cores for Failed Secondary Asymmetric Multiprocessing Instance," which claims priority to U.S. Provisional Patent Application No. 62/946,289 filed on Dec. 10, 2019, all of which is hereby incorporated by reference in its entirety.

TECHNICAL FIELD

The present disclosure generally relates to systems and methods for an asymmetric multiprocessing (AMP) instance, and more specifically to fault isolation and recovery of CPU cores from a failed secondary AMP instance.

BACKGROUND

An asymmetric multiprocessing (AMP) system is a multiprocessor computer system having multiple central processing units (CPUs) which may run multiple Operating Systems (OSs) that are independent of each other. In other words, each CPU may have its own private memory space, which contains the OS and the applications that are to run on that CPU. In addition, there may be some shared memory space that is used for multiprocessor communication.

DESCRIPTION OF EXAMPLE EMBODIMENTS

Overview

Figure 1:
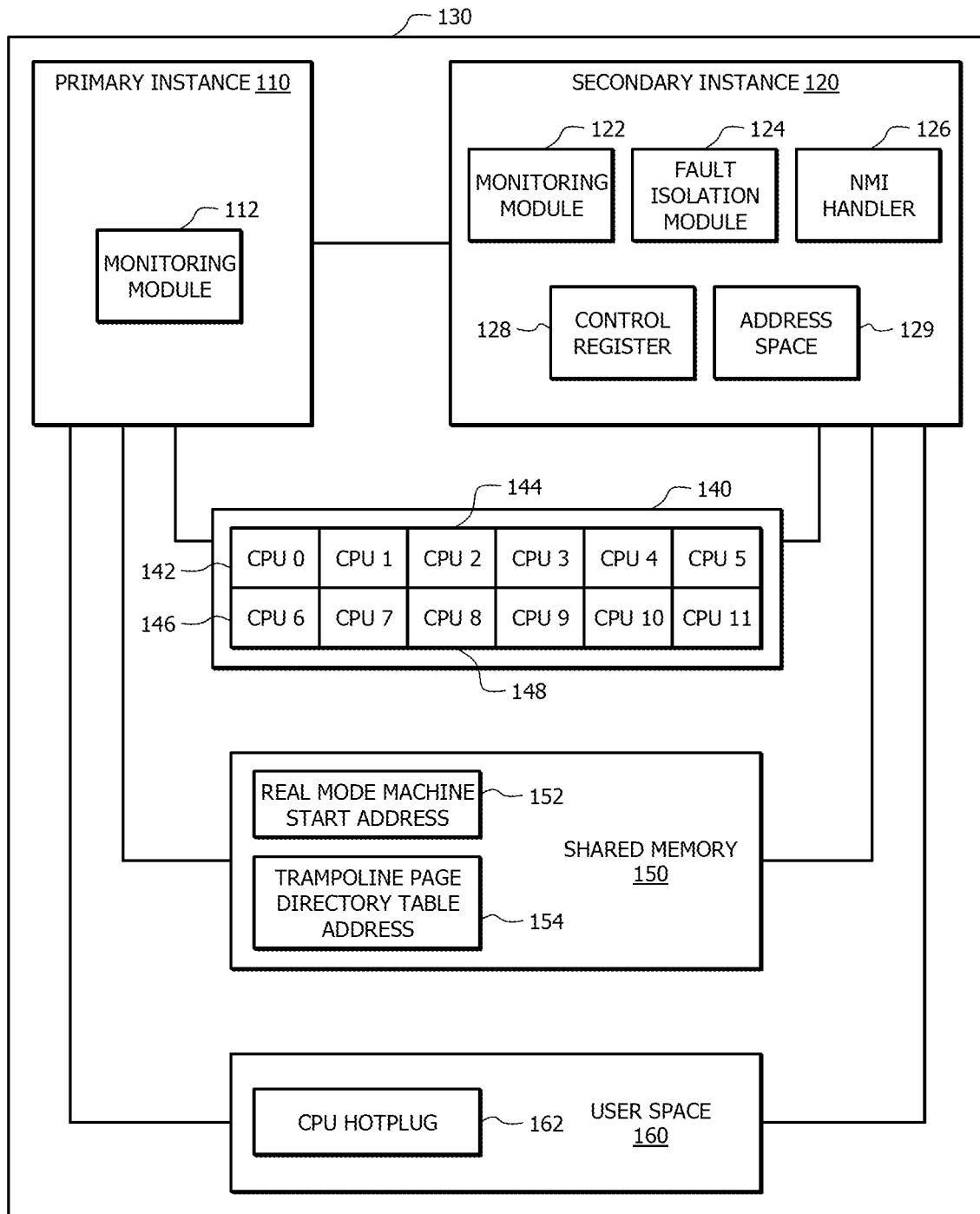
FIG. 1 illustrates a system for fault isolation and recovery of CPU cores from a failed secondary AMP instance, in accordance with certain embodiments.

According to an embodiment, a system may include one or more processors and one or more computer-readable non-transitory storage media comprising instructions that, when executed by the one or more processors, cause one or more components of the system to perform operations including, executing a software process of a secondary instance, the secondary instance running in parallel with a primary instance and associated with a plurality of cores including a bootstrap core, registering a non-maskable interrupt for the bootstrap core in the secondary instance, determining whether the secondary instance is in a fault state, wherein, if the secondary instance is in the fault state, halting the plurality of cores associated with the secondary instance, without impact to the primary instance, and recovering the bootstrap core by switching a context of the bootstrap core from the secondary instance to the primary instance via the non-maskable interrupt.

A Central Processing Unit (CPU) hotplug may be issued by the primary instance based on the determination that the secondary instance is in the fault state. The CPU hotplug may deliver the non-maskable interrupt to the bootstrap core.

Additionally, the non-maskable interrupt may initiate a recovery sequence including writing a real mode trampoline page directory table address associated with the primary instance to a control register of the bootstrap core. The recovery sequence may further include branching execution of the bootstrap core to a real mode machine start address of the primary instance. The real mode trampoline page directory table address and the real mode machine start address associated with the primary instance may be retrieved from a memory location shared between the primary instance and the secondary instance that is mapped into an address space of the secondary instance.

Moreover, the operations may include recovering the remaining cores of the plurality of cores after recovery of the bootstrap core.

According to another embodiment, a method may include the steps of executing a software process of a secondary instance, the secondary instance running in parallel with a primary instance and associated with a plurality of cores including a bootstrap core, registering a non-maskable interrupt for the bootstrap core in the secondary instance, determining whether the secondary instance is in a fault state, wherein, if the secondary instance is in the fault state, halting the plurality of cores associated with the secondary instance, without impact to the primary instance, and recovering the bootstrap core by switching a context of the bootstrap core from the secondary instance to the primary instance via the non-maskable interrupt.

According to yet another embodiment, one or more computer-readable non-transitory storage media may embody instructions that, when executed by a processor, cause the performance of operations, including executing a software process of a secondary instance, the secondary instance running in parallel with a primary instance and associated with a plurality of cores including a bootstrap core, registering a non-maskable interrupt for the bootstrap core in the secondary instance, determining whether the secondary instance is in a fault state, wherein, if the secondary instance is in the fault state, halting the plurality of cores associated with the secondary instance, without impact to the primary instance, and recovering the bootstrap core by switching a context of the bootstrap core from the secondary instance to the primary instance via the non-maskable interrupt.

Technical advantages of certain embodiments of this disclosure may include one or more of the following. The systems and methods described herein may allow for fault isolation of an AMP instance, wherein the fault is contained within the failed instance and not propagated to another instance. The systems and methods described herein further allow for recovery of CPU cores from the failed instance by another instance.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

An AMP may be used to reduce downtime during router upgrades. Specifically, during an upgrade, a new (secondary) instance comprising a Network Operating System (NOS) kernel may be instantiated using AMP to run in parallel with a current (primary) instance. This approach may eliminate the need for an external hypervisor and may allow the primary and secondary instances to run bare-metal in cooperation with one another. The two instances may run simultaneously only during the upgrade window until the secondary instance is deemed ready to take control of the system, at which point the primary instance may shut down and enable the secondary instance to become the system owner. During this process (wherein the secondary instance is booting), the secondary instance may encounter a fault or panic and/or end up in a halted or stuck state. When this happens, conventionally, a panic handler in the secondary instance may prepare and load a crashkernel parameter and reboot the entire system, resulting in the undesirable shutdown of both the primary and secondary instances.

The present disclosure provides for systems and methods wherein faults or panics in a secondary instance may be isolated to the secondary instance (without impact to the primary instance), and the primary instance may recover the CPU cores from the failed secondary instance and activate them in the primary instance.

FIG. 1 depicts a system 100 for providing fault isolation and recovery of CPU cores from a failed secondary AMP instance. System 100 may include a primary instance 110 and a secondary instance 120 communicatively coupled in an AMP context 130 without a hypervisor. Primary instance 110 and secondary instance 120 may each comprise a NOS kernel and may be running side-by-side in association with the same CPU complex 140. In an embodiment, CPU complex 140 may include twelve CPU cores (CPU0, CPU1 . . . CPU11). Primary instance 110 may include a monitoring module 112 for monitoring a boot process of the secondary instance 120. In an embodiment, the monitoring module 112 of the primary instance 110 may include a boot timer that may monitor the time that has elapsed since commencement of a boot of the secondary instance 120 to determine whether an error has occurred in the secondary instance 120. For example, if the time that has elapsed since commencement of a boot has exceeded a pre-determined value, a determination may be made that the secondary instance 120 is in an error or stuck state. Secondary instance 120 may include a monitoring module 122 for monitoring for completion of a boot of the secondary instance 120. Secondary instance 120 may further include a fault isolation module 124, a non-maskable interrupt (NMI) hander 126, and a control register 128 such as a cr3 register. Each of these will be described below. Primary instance 110 and secondary instance 120 may also be communicatively coupled to a shared memory 150 and user space 160.

According to an embodiment, the primary instance 110 may instantiate (or initiate the booting of) the secondary instance 120 during a system upgrade, e.g., router upgrade, to reduce the downtime during the upgrade. The secondary instance 120 may execute a software process to commence booting, and may run in parallel with the primary instance 110. Primary instance 110 may make available a plurality of CPU cores from the CPU complex 140 to the secondary instance 120. By way of example, primary instance 110 may make available four CPU cores to the secondary instance 120. These may include CPU0, CPU2, CPU6, CPU8, corresponding to elements 142, 144, 146, and 148, respectively, in FIG. 1. The secondary instance 120 may boot with CPU0 142 as the bootstrap processor (referred to throughout this disclosure as the "bootstrap core.") The remaining cores made available to the secondary instance 120, i.e., CPU2 144, CPU6 146, CPU8 148, may serve as application processors. When the secondary instance 120 begins booting, bootstrap core 142 may boot first, followed by the remaining cores, i.e., the application processors.

In operation, prior to booting the secondary instance 120, the primary instance 110 may save its real mode machine start address 152 and its real mode trampoline page directory table address 154 into a page of the shared memory 150 during its boot up. This page will eventually be mapped into an address space 129 of the secondary instance 120. If the secondary instance 120 fails (enters a fault or panic state), the real mode machine start address 152 and the real mode trampoline page directory table address 154 may be used to recover the bootstrap core 142 of the secondary instance 120, and more specifically, to switch the context of the bootstrap core 142 from the secondary instance 120 to the primary instance 110, and then recover the remaining cores 144, 146, 148 of the secondary instance 120, as further described below.

Next, the system may commence booting the secondary instance 120, and may the initiate the following operations. First, the fault isolation module 124 of the secondary instance 120 may enable a fault isolation feature. The fault isolation module 124 may be initialized as a kernel module early during the boot of the secondary instance 120. The fault isolation feature of the fault isolation module 124 may dynamically install a custom panic hander that may carry out a series of operations to ensure that, if the secondary instance 120 enters a fault or panic state, the CPU cores 142, 144, 146, 148 of the secondary instance 120 may be halted and isolated without impact to the primary instance 110. The fault isolation feature may be enabled or disabled dynamically. For example, the fault isolation feature may be enabled at boot for the secondary instance 120, and then dynamically disabled once the secondary instance 120 has booted to the extent that it may take control of the system. Once the fault isolation feature is disabled, a default panic handling mechanism of the system 100 may be restored.

Next, the fault isolation module 124 of the secondary instance 120 may also register a non-maskable interrupt (NMI) handler 126 early during boot up of the secondary instance 120. If the secondary instance 120 fails (encounters a fault or panic), the NMI handler 126 may be used to initiate recovery of the bootstrap core 142 from the secondary instance 120 to the primary instance 110.

It is to be understood that the foregoing operations need not necessarily be conducted in the order they are described, but may be conducted in any order, as understood by one of skill in the art.

Additionally, at the onset of the boot of the secondary instance 120, the monitoring module of the 112 of the primary instance 110 and the monitoring module 122 of the secondary instance 120 may begin monitoring the boot process. The purpose of the monitoring modules 112, 122 is to determine whether the booting process completes successfully, or whether there is an error or panic during the booting process.

The monitoring module 122 of the secondary instance 120 may monitor for fault or panic in the CPU cores 142, 144, 146, 148 associated with the secondary instance 120, so that if there is a fault or panic during the boot, the secondary instance may invoke the fault isolation feature of the fault isolation module 124.

The monitoring module 112 of the primary instance 110 may include a boot timer that may be instantiated upon commencement of booting the secondary instance 120. For example, the timer may be set for a pre-determined length of time (i.e., the expected time for completion of the boot). If the timer expires before the primary instance 110 receives confirmation of completion of the boot, the primary instance 110 may determine that the secondary instance 120 has encountered an error or is in a stuck mode. When the secondary instance 120 is said to be in an error or stuck mode, it means that it is not making progress in the boot process. When this happens, as described below, the primary instance 110 may induce a panic state by invoking a panic via the NMI handler 126, and then invoke the fault isolation feature of the fault isolation module 124.

In some embodiments, the monitoring module 112 of the primary instance 110 may also monitor for successful completion of the boot based on receipt of a shutdown signal from the secondary instance 120 (i.e., the secondary instance 120 may send a shutdown signal to the primary instance 110 to indicate that booting is complete and that the primary instance 110 may shut down). If the shutdown signal is received by the primary instance 110, successful booting of the secondary instance 120 may be confirmed and the secondary instance 120 may take over control of the system. If the shutdown signal is not received, the primary instance 110 may determine whether the boot timer has expired. If, for example, the boot timer has expired without receipt of a shutdown signal, the primary instance 110 may determine that the secondary instance 120 is in an error or stuck state. The primary instance 110 may then induce a panic state by invoking a panic via the NMI handler 126, and invoke the fault isolation feature of the fault isolation module 124.

In operation, if the boot of the secondary instance 120 has not been completed and it is determined that the secondary instance 120 is in a fault or panic state (as opposed to an error or stuck state), the particular CPU core of the secondary instance 120 which may be handling the fault or panic may invoke the fault isolation feature of the fault isolation module 124, wherein a custom panic hander may carry out a sequence of operations to halt and isolate the CPU cores 142, 144, 146, 148 of the secondary instance 120 without impact to the primary instance 110. For purposes of illustration, the present disclosure will describe the bootstrap core 142 as the CPU core handling the fault or panic state, but it is to be understood that any CPU core of the secondary instance 120 may handle the fault or panic.

The custom panic handler allows the system to avoid crashkernel and certain reboot parameters associated with customary panic handlers. The custom panic handler is designed to ensure fault is isolated and CPU cores 142, 144, 146, 148 of the secondary instance 120 are in a HALT state such that they can be recovered if needed at a later point. The custom panic handler can be invoked on any core(s) that encounters the fault or panic and will take that core(s) to a HALT state.

Specifically, the custom panic handler of the fault isolation module 124 may disable local interrupts (which ensures that the bootstrap core 142 does not service any more interrupts as the system is in a faulty state, and also ensures that the bootstrap core 142 is not interrupted from handling the panic logic to completion), dump kernel messages and backtrace (which are logged into a kernel log buffer (not shown) to aid in debugging), shuts down CPU cores 144, 146, 148 of the secondary instance 120, and then puts the bootstrap core 142 (which in this example is the core which is handling the fault or panic) into a HALT mode. When in a HALT state, the bootstrap core 142 may keep looping in an idle state, while waiting for a global "enable" flag to be set. When the flag is set, the core may come out of the HALT state, as described below. All of these processes of the secondary instance 120 may be completed without impact to the primary instance 110 because the core handling the fault or panic state (here, the bootstrap core 142) may use a local Advanced Programmable Interrupt Controller (APIC) vector to send an Inter-processor Interrupt (IPI) to the other CPU cores 144, 146, 148 in the secondary instance. Thus, according to the present disclosure, the conventional operation of preparing and/or loading a crashkernel, which would undesirably impact the primary instance 110, may be avoided.

In another embodiment, if the boot of the secondary instance 120 has not been completed and it is determined that the secondary instance 120 is in an error or stuck state (as opposed to a fault or panic state), as determined by the primary instance 110 when the boot timer has expired and/or a shutdown signal has not been received, the primary instance 110 may induce a panic state by invoking a panic from within the NMI handler 126, which the secondary instance 120 had registered early in the boot process. In particular, the primary instance 110 may send the NMI to the bootstrap core 142 in secondary instance 120 by the CPU hotplug 162 from user space 160. The NMI handler 126 may make a determination as to whether the fault isolation has been triggered. If fault isolation has not been triggered (as would be the case in the error/stuck scenario), the NMI handler 126 may invoke the custom panic handler of the fault isolation module 124 to trigger the fault isolation, as described above. The CPU cores 144, 146, 148 may be shut down, and the bootstrap core 142 may be placed in a HALT mode.

Once all of the CPU cores 142, 144, 146, 148 of the secondary instance have been shut down and/or halted, the primary instance may initiate the second feature of the present disclosure, i.e., recovery of the CPU cores by switching the context from the secondary instance to the primary instance. Specifically, the primary instance 110 may begin by initiating recovery of the bootstrap core 142 from the halted secondary instance 120 by issuing a CPU hotplug 162 from user space 160. The CPU hotplug 162 may invoke the NMI handler 126, which was registered in the secondary instance 120 early during the boot. The NMI handler 126 may trigger the wakeup of the bootstrap core 142 by setting the global "enable" flag. When the global "enable" flag is set, the bootstrap core 142 may come out of HALT state. After setting the global "enable" flag, the NMI handler 126 may determine if fault isolation has been triggered. If it is determined that fault isolation has been triggered, the bootstrap core may be "woken up". If it is determined that fault isolation has not been triggered, the NMI handler 126 may invoke the custom panic handler of the fault isolation module to trigger fault isolation. The recovery process may then be triggered as the bootstrap core 142 wakes up.

Then, the NMI handler 126 may invoke a special recovery sequence comprising at least two steps: 1) the context of the bootstrap core 142 may be switched from the secondary instance 120 to the primary instance 110 by writing the real mode trampoline page directory table address 154 of the primary instance 110 from the shared memory 150 to a control register 128 of the secondary instance 120; and 2) execution of the bootstrap core 142 may be branched off to the real mode machine start address of the primary instance 110. The step of branching execution to the primary instance may be done by leveraging an advanced power management (APM) restart hook. Once these steps are completed, the bootstrap core 142 may be executed (booted) back online in the primary instance 110. Then, the primary instance 110 may recover the remaining cores 144, 146, 148 associated with the secondary instance 120 by conventional CPU hotplug sequences, e.g., by IPI start-up from the primary instance 110.

While the two features of the present disclosure, namely the fault isolation and CPU core recovery features, have been described together in system 100, it is to be understood that these features may be separable and may function independently in one or more systems. In other words, the fault isolation feature (and the elements related to its function) may operate separately and apart from the CPU core recovery feature (and the elements related to its function), as understood by one of ordinary skill in the art.

Figure 2A:
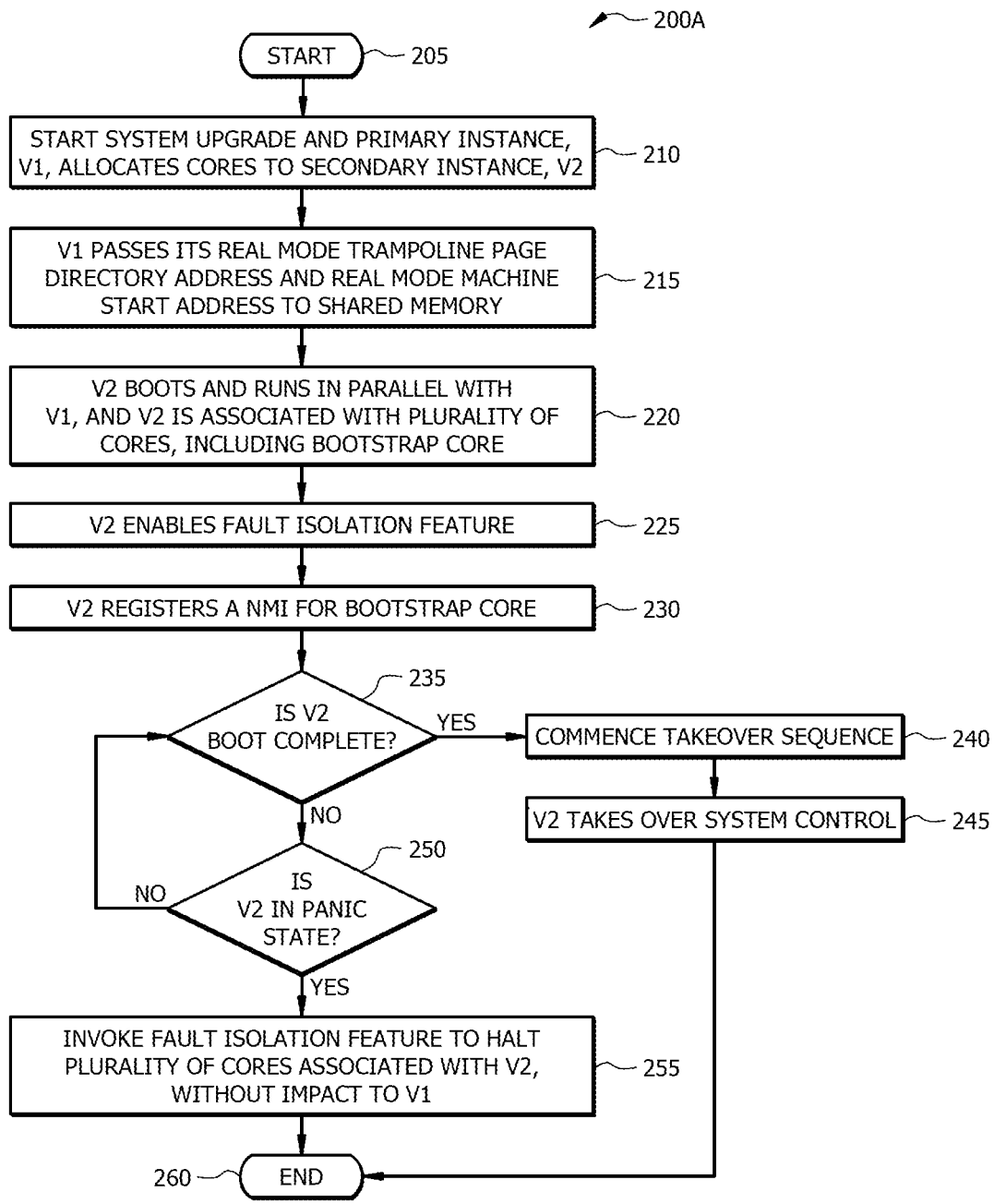
FIG. 2A illustrates a flow diagram of a method for fault isolation of a secondary AMP instance, in accordance with certain embodiments.
Figure 2B:
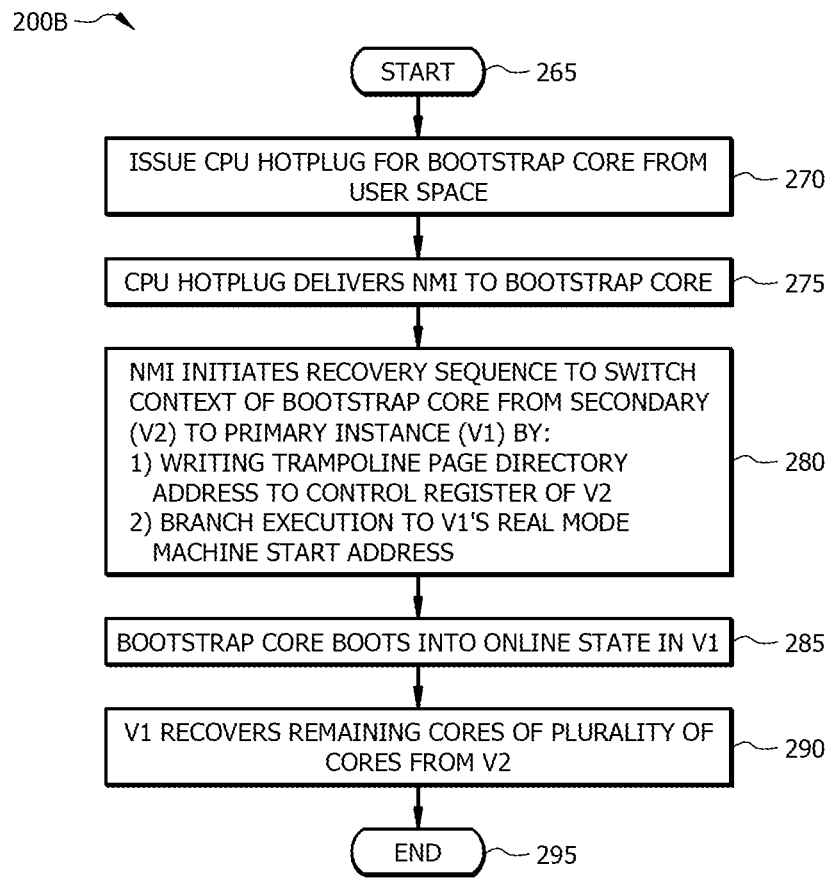
FIG. 2B illustrates a flow diagram of a method for recovery of CPU cores from a failed secondary AMP instance, in accordance with certain embodiments.

Reference is now made to FIGS. 2A and 2B, wherein are shown methods 200A and 200B for isolating a failed secondary AMP instance and for recovering CPU cores of a failed secondary instance, respectively, in accordance with the present disclosure. While methods 200A and 200B of FIGS. 2A and 2B are shown separately, in an embodiment, methods 200A and 200B may be combined to form a single method 200, wherein the process of isolating a failed secondary instance (e.g., method 200A of FIG. 2A) may be followed by recovering the CPU cores of the failed secondary instance (e.g., method 200B of FIG. 2B). In other embodiments, the method 200A of isolating a failed secondary instance may be separate and distinct from the method 200B of recovering CPU cores of a failed secondary instance.

With reference now to FIG. 2A, the method 200A may begin at step 205. At step 210, a system upgrade (such as a router upgrade) may be initiated, wherein a primary instance may allocate a plurality of CPU cores to a secondary instance. At step 215, the primary instance may save its real mode trampoline page directory address and its real mode machine start address into a page of a shared memory, which page may be mapped into an address space of the secondary instance. As described below in conjunction with FIG. 2B, if the secondary instance fails (encounters a fault or panic), the real mode machine start address and the real mode trampoline page directory table address may be used to recover the bootstrap core of the secondary instance, and more specifically, to switch the context of the bootstrap core from the secondary instance to the primary instance, and then recover the remaining cores of the secondary instance. At step 220, the secondary instance may execute a software process (i.e., a boot process). The secondary instance may run in parallel with the primary instance, and may be associated with the plurality of cores allocated by the primary instance. The plurality of cores may include a bootstrap core (i.e., a bootstrap processor) and one or more application cores (or application processors). In conjunction with the start of the boot of the secondary instance in step 220, a boot timer may be started by the primary instance to monitor the boot process of the secondary instance.

At step 225, the secondary instance may enable a fault isolation feature in a core from the plurality of cores allocated to the secondary instance. In an embodiment, the fault isolation feature may be enabled in the bootstrap core, which may be assigned to handle any error/fault/panic state encountered by the secondary instance. If the secondary instance enters into an error/fault/panic state, the fault isolation feature may initiate a sequence of operations that may halt and isolate the plurality of cores of the secondary instance, without impact to the primary instance. The fault isolation feature may be dynamically enabled or disabled.

At step 230, the secondary instance may register a non-maskable interrupt (NMI) handler for the bootstrap core. If the secondary instance enters into a fault or panic state, the non-maskable interrupt may be used to initiate recovery of the bootstrap core from the secondary instance to the primary instance.

At step 235, a determination may be made as to whether the boot of the secondary instance is complete. If, as step 235, it is determined that the boot of the secondary instance is compete, the method may proceed to step 240, wherein the secondary instance may commence a takeover sequence. The takeover sequence may include the secondary instance disabling the fault isolation feature (as the feature is not needed upon successful completion of the boot), and sending a shutdown signal to the primary instance, indicating that the primary instance may shutdown. At step 245, the secondary instance may take over system control. At step 260, the method may end.

If, however, at step 235, it is determined that the boot of the secondary instance is not compete, the method may proceed to step 250, wherein a determination is made as to whether the secondary instance is in a fault or panic state. In an embodiment, the determination as to whether the secondary instance is in fault or panic state may be made by the secondary instance. In another embodiment, the determination as to whether the secondary instance is in error may be made by the primary instance. If, at step 250, it is determined that the secondary instance is not in a panic state, the method may return to step 235, wherein a determination may be made as to whether the boot is complete.

If, at step 250, it is determined that the secondary instance is in a fault or panic state, the method may proceed to step 255, wherein the fault isolation feature may be invoked, and the plurality of cores associated with the secondary instance may be halted and isolated without impact to the primary instance. Specifically, the core handling the fault or panic in the secondary instance may invoke the fault isolation feature. For purposes of illustration, the bootstrap core may be the core handling the fault or panic and may invoke the fault isolation feature by initiating the following series of steps: 1) disabling the local interrupts; 2) dumping kernel messages and backtraces; 3) shutting down the other cores of the secondary instance; and 4) placing itself into a halt mode. Each of these steps relating to the secondary instance may be completed without impact to the primary instance because the core handling the panic state (here, the bootstrap core) may use a local Advanced Programmable Interrupt Controller (APIC) vector to send an Inter-processor Interrupt (IPI) to the other CPU cores in the secondary instance. As such, this sequence excludes the conventional method of preparing and loading a crashkernel, and may ensure that that the panic in the secondary instance is contained within that instance and is not propagated to the primary instance. At step 260, the method may end. It is to be understood that the steps described in conjunction with method 200A of FIG. 2A may correspond to the fault isolation mechanisms and features described in conjunction with the system 100 of FIG. 1.

In an embodiment, after step 255, the primary instance may proceed with recovery of the plurality of cores of the failed secondary instance, beginning with the bootstrap core, by switching the context of the bootstrap core from the secondary instance to the primary instance, in accordance with method 200B of FIG. 2B.

Reference is now made to FIG. 2B, wherein is shown a method 200B for recovering the CPU cores of a failed secondary instance. A "failed secondary instance" refers to the secondary instance being in a fault or panic state. In an embodiment, the method 200B of FIG. 2B may presume that the plurality of CPU cores of the failed secondary instance have been halted. The method may begin at step 265. At step 270, the primary instance may detect that the secondary instance is in a fault or panic state and may initiate recovery of the bootstrap core by issuing a CPU hotplug from a user space. At step 275, the CPU hotplug may deliver the NMI, which was registered early during the boot process of the secondary instance (see step 225 of FIG. 2A), to the bootstrap core. The delivery of the NMI may "wake up" the bootstrap core. At step 280, the NMI may initiate recovery of the bootstrap core by switching the context of the bootstrap core from the secondary instance to the primary instance. The step of switching the context of the bootstrap core may include a special recovery sequence wherein: 1) the real mode trampoline page directory table address (which was saved to a shared memory and was mapped into an address space of the secondary instance in step 215 of FIG. 2A) may be written to a control register of the secondary instance; and 2) the execution of the bootstrap core may be branched to the real mode machine start address (which was likewise saved in step 215 of FIG. 2*a*) of the primary instance. The step of branching execution to the primary instance may be done by leveraging an advanced power management (APM) restart hook.

At step 285, the bootstrap core may be executed (booted) into an online state in the primary instance. At step 290, the primary instance may recover the rest of the plurality of cores using conventional CPU hotplug sequences, e.g., by IPI start-up from the primary instance. As step 295, the method may end.

Figure 3:
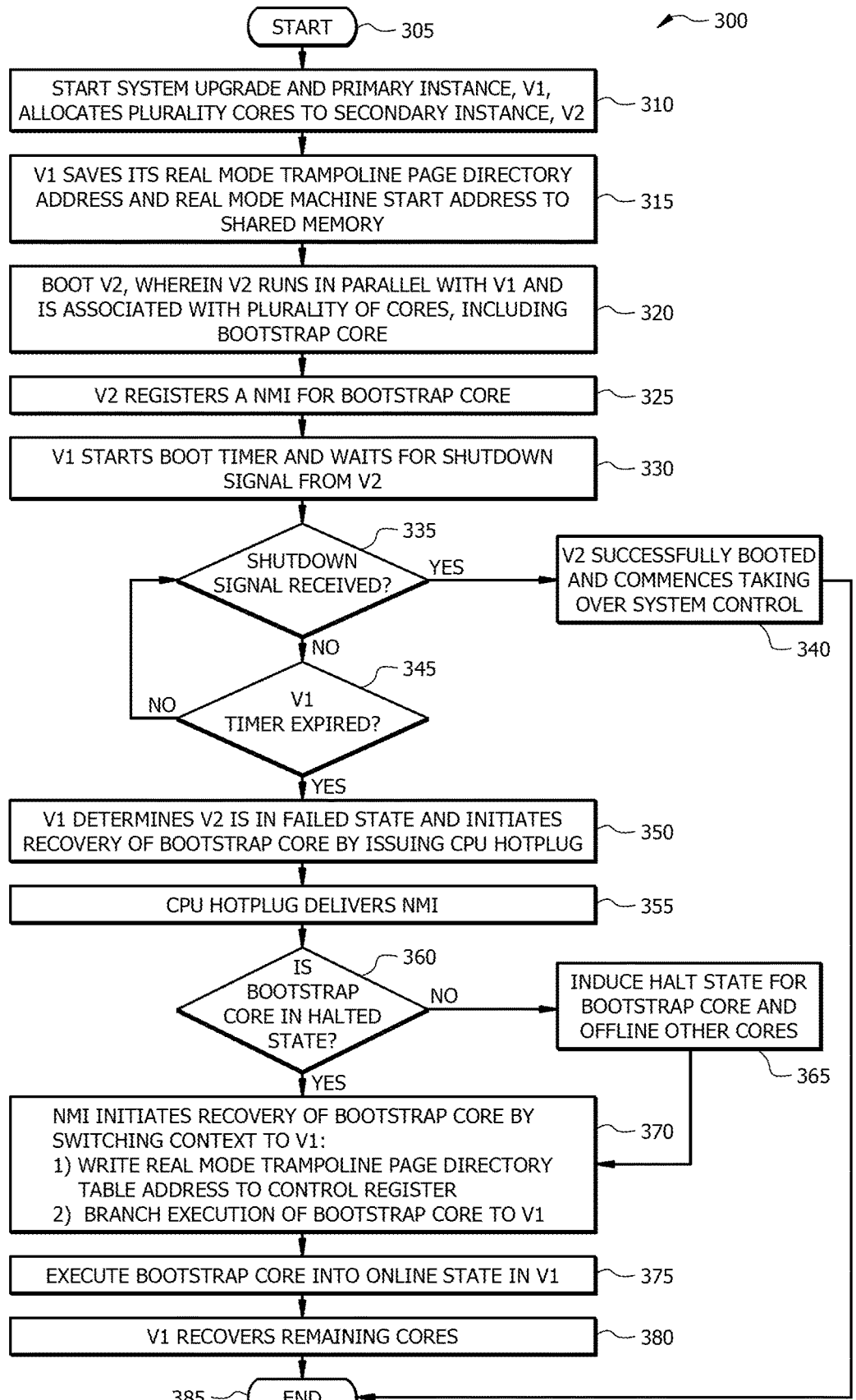
FIG. 3 illustrates a flow diagram of another method for recovery of CPU cores from a failed secondary AMP instance, in accordance with certain embodiments.

Reference is now made to FIG. 3, wherein is shown method 300, which is another embodiment for recovering CPU cores of a failed secondary instance, according to the present disclosure. The method may begin at step 305. At step 310, a system upgrade may be initiated, wherein a primary instance may allocate a plurality of CPU cores to a secondary instance. At step 315, the primary instance may save its real mode trampoline page directory address and its real mode machine start address into a page of a shared memory (shared between the primary and secondary instances), which page may be mapped into address space of the secondary instance. If the secondary instance fails (encounters a fault or panic), the real mode machine start address and the real mode trampoline page directory table address may be used to recover the bootstrap core of the secondary instance, and more specifically, to switch context of the bootstrap core from the secondary instance to the primary instance. At step 320, the secondary instance may execute a software process (i.e., a boot process). The secondary instance may run in parallel with the primary instance, and may be associated with the plurality of cores allocated by the primary instance. The plurality of cores may include a bootstrap core (i.e., a bootstrap processor core) and one or more application cores.

At step 325, the secondary instance may register a non-maskable interrupt with the bootstrap core early during the boot of the secondary instance. If the secondary instance enters into an error, fault, or panic state, the non-maskable interrupt may be used to initiate recovery of the bootstrap core from the secondary instance to the primary instance.

At step 330, the primary instance may start a boot timer and wait for a shutdown signal from the secondary instance. For example, the timer may be set for a pre-determined length of time (i.e., the expected time for completion of the boot). If the timer expires before the primary instance receives a shutdown signal from the secondary instance indicating completion of the boot, the primary instance may determine that an error has occurred during booting of the secondary instance and may initiate a recovery sequence, as described below.

At step 335, a determination made be made as to whether a shutdown signal has been received by the primary instance from the secondary instance. If, at step 335, a shutdown signal has been received by the primary instance from the secondary instance, the method may proceed to step 340, wherein the secondary instance is successfully booted up and may commence taking over system control. At step 385, the method may end.

If, at step 335, it is determined that a shutdown signal has not been received by the primary instance from the secondary instance, the method may proceed to step 345, wherein a determination may be made as to whether the timer initiated by the primary instance has expired. If, at step 345, it is determined that the timer has not expired, the method may proceed back to step 335 and a determination may be made as to whether the shutdown signal has been received.

If, however, at step 345, it is determined that the timer has expired, the method may proceed to step 350, wherein the primary instance may determine that the secondary instance is in an error/stuck state and may initiate recovery of bootstrap core of the secondary instance by issuing a CPU hotplug. The CPU hotplug may be issued for the bootstrap core in the secondary instance from a user space associated with the primary instance. At step 355, the CPU hotplug may deliver the NMI, which was registered in the secondary instance early during the boot, to the bootstrap core. An online flag of the bootstrap core may be set to enabled, as described above in conjunction with FIG. 1.

At step 360, a determination may be made as to whether the bootstrap core is in a halted state. If, at step 360, it is determined that the bootstrap core is not in a halted state, then the method may proceed to step 365 wherein a halted state may be induced for the bootstrap core by the NMI. The remaining cores (the application processors) of the plurality of cores are also placed offline via an IPI, and the method may proceed to step 370. The plurality of cores may be halted without impact to the primary instance, as discussed above in conjunction with FIG. 2A. Likewise, if at step 360 it is determined that the bootstrap core is in a halted state, then the method may proceed to step 370, wherein the NMI may initiate recovery of the bootstrap core by "waking up" the bootstrap core and switching the context of the bootstrap core from the secondary instance to the primary instance. This step of switching the context of the bootstrap core may include a recovery sequence wherein: 1) the real mode trampoline page directory table address is written from the shared memory to a control register of the secondary instance; and 2) the NMI branches execution of the bootstrap core to the real mode machine start address of the primary instance. In an embodiment, the control register may comprise a cr3 register. The bootstrap core may switch its context from the secondary instance to the primary instance by writing the real mode page table directory address of the primary instance to this register. The step of branching execution to the primary instance may be accomplished by leveraging an advanced power management (APM) restart hook.

At step 375, the bootstrap core may be executed (booted) into an online state in the primary instance. At step 380, the primary instance may recover the remaining cores (i.e., the application processors) of the plurality of cores using conventional CPU hotplug sequences, e.g., by IPI start-up from the primary instance. The method may end at step 385.

In sum, the systems and methods of the present disclosure may allow for isolation of a failed secondary instance in an AMP context, and recovery of CPU cores from the failed secondary instance. Specifically, the present disclosure allows for a mechanism whereby, during a system upgrade, a fault or panic in one instance is precluded from impacting other AMP instances. Moreover, the present disclosure allows for recovery of CPU cores from the failed instance by a primary instance so that the processes of the system upgrade may continue.

Figure 4:
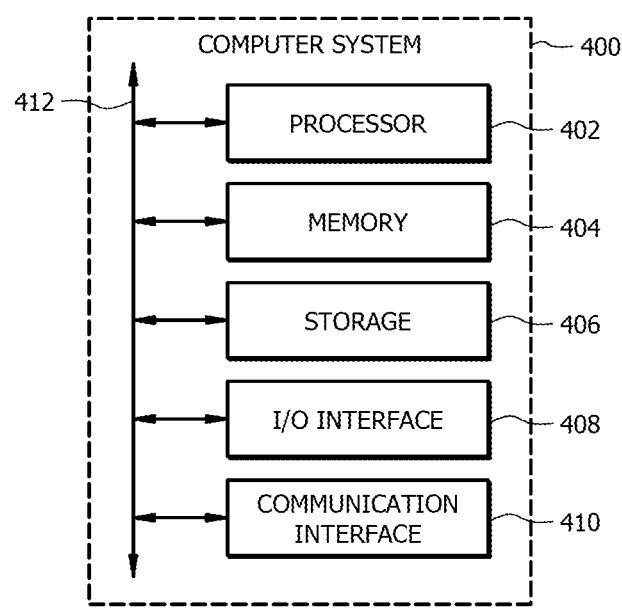
FIG. 4 illustrates a computer system, in accordance with certain embodiments.

Reference is now made to FIG. 4, wherein is shown an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate.

Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system, comprising:
   one or more processors; and
   one or more computer-readable non-transitory storage media comprising instructions that, when executed by the one or more processors, cause one or more components of the system to perform operations comprising:
      executing a software process of a secondary instance, wherein the secondary instance is associated with a plurality of cores, including a bootstrap core;
      registering a non-maskable interrupt for the bootstrap core in the secondary instance;
      determining that the secondary instance is in a fault state; and
      halting the plurality of cores associated with the secondary instance.

2. The system of claim 1, the operations further comprising issuing a Central Processing Unit (CPU) hotplug by a primary instance in response to determining that the secondary instance is in the fault state.

3. The system of claim 2, wherein the CPU hotplug delivers the registered non-maskable interrupt to the bootstrap core.

4. The system of claim 1, the operations further comprising initiating, by the non-maskable interrupt, a recovery sequence, wherein the recovery sequence comprises writing a real mode trampoline page directory table address associated with a primary instance to a control register of the bootstrap core.

5. The system of claim 1, the operations further comprising initiating, by the non-maskable interrupt, a recovery sequence, wherein the recovery sequence comprises branching execution of the bootstrap core to a real mode machine start address of a primary instance.

6. The system of claim 1, wherein the secondary instance and a primary instance are communicatively coupled to a memory location shared between the primary instance and the secondary instance.

7. The system of claim 1, the operations further comprising recovering remaining cores of the plurality of cores after recovery of the bootstrap core.

8. A method, comprising:
   executing a software process of a secondary instance, wherein the secondary instance is associated with a plurality of cores, including a bootstrap core;
   registering a non-maskable interrupt for the bootstrap core in the secondary instance;
   determining that the secondary instance is in a fault state; and
   halting the plurality of cores associated with the secondary instance.

9. The method of claim 8, further comprising issuing a Central Processing Unit (CPU) hotplug by a primary instance in response to determining that the secondary instance is in the fault state.

10. The method of claim 9, wherein the CPU hotplug delivers the registered non-maskable interrupt to the bootstrap core.

11. The method of claim 8, further comprising initiating, by the non-maskable interrupt, a recovery sequence, wherein the recovery sequence comprises writing a real mode trampoline page directory table address associated with a primary instance to a control register of the bootstrap core.

12. The method of claim 8, further comprising initiating, by the non-maskable interrupt, a recovery sequence, wherein the recovery sequence comprises branching execution of the bootstrap core to a real mode machine start address of a primary instance.

13. The method of claim 8, wherein the secondary instance and a primary instance are communicatively coupled to a memory location shared between the primary instance and the secondary instance.

14. The method of claim 8, further comprising recovering remaining cores of the plurality of cores after recovery of the bootstrap core.

15. One or more computer-readable non-transitory storage media embodying instructions that, when executed by a processor, cause performance of operations comprising:
   executing a software process of a secondary instance, wherein the secondary instance is associated with a plurality of cores, including a bootstrap core;
   registering a non-maskable interrupt for the bootstrap core in the secondary instance;
   determining that the secondary instance is in a fault state; and
   halting the plurality of cores associated with the secondary instance.

16. The one or more computer-readable non-transitory storage media of claim 15, the operations further comprising issuing a Central Processing Unit (CPU) hotplug by a primary instance in response to determining that the secondary instance is in the fault state.

17. The one or more computer-readable non-transitory storage media of claim 16, wherein the CPU hotplug delivers the registered non-maskable interrupt to the bootstrap core.

18. The one or more computer-readable non-transitory storage media of claim 15, the operations further comprising initiating, by the non-maskable interrupt, a recovery sequence, wherein the recovery sequence comprises writing a real mode trampoline page directory table address associated with a primary instance to a control register of the bootstrap core.

19. The one or more computer-readable non-transitory storage media of claim 15, the operations further comprising initiating, by the non-maskable interrupt, a recovery sequence, wherein the recovery sequence comprises branching execution of the bootstrap core to a real mode machine start address of a primary instance.

20. The one or more computer-readable non-transitory storage media of claim 15, wherein the secondary instance and a primary instance are communicatively coupled to a memory location shared between the primary instance and the secondary instance.

\* \* \* \* \*